United States Patent [19]

Boutet et al.

[11] Patent Number: 5,134,290
[45] Date of Patent: Jul. 28, 1992

[54] COLLECTOR FOR STORAGE PHOSPHOR IMAGING SYSTEM

[75] Inventors: John C. Boutet, Rochester; Bruce R. Whiting, Pittsford; Michael B. Brandt, Walworth, all of N.Y.

[73] Assignee: Eastman Kodak Company, Rochester, N.Y.

[21] Appl. No.: 796,209

[22] Filed: Nov. 22, 1991

[51] Int. Cl.⁵ .............................................. G01N 23/04
[52] U.S. Cl. .............................. 250/327.2; 250/484.1
[58] Field of Search ............. 250/327.2, 484.1, 227.26; 359/861

[56] References Cited

U.S. PATENT DOCUMENTS

Re. 31,847 3/1985 Luckey ............................. 250/327.2
4,346,295 8/1982 Tanaka et al. .................... 250/327.2
4,743,758 5/1988 Chan et al. ................... 250/327.2 F
4,743,759 5/1988 Boutet ............................. 250/327.2

Primary Examiner—Carolyn E. Fields
Attorney, Agent, or Firm—William F. Noval

[57] ABSTRACT

A light collector for collecting and detecting light emitted by, reflected from, or transmitted through a scanned information medium. The collector includes a planar mirror and a facing pyramidal mirror which collect light and direct it to a photodetector located at a centrally located aperture in the apex region of the pyramidal mirror. The collector preferably collects light emitted by a storage phosphor which has been stimulated by stimulating light passed through aligned slots in the collector.

5 Claims, 2 Drawing Sheets

COLLECTOR FOR STORAGE PHOSPHOR IMAGING SYSTEM

BACKGROUND of the INVENTION

1. Field of Invention

The invention relates to apparatus for reading out the image stored in a storage phosphor, also known as a stimulable phosphor. More particularly, this invention relates to apparatus for collecting and detecting the radiation emitted from the storage phosphor in response to interrogation by stimulating radiation.

2. Background Art

In a storage phosphor imaging system, as described in U.S. Pat. No. Re. 31,847, reissued Mar. 12, 1985 to Luckey, a photostimulable storage phosphor sheet is exposed to an image-wise pattern of short wavelength radiation, such as x-ray radiation, to record a latent image pattern in the storage phosphor. The latent image is read out by stimulating the phosphor with a relatively long wavelength stimulating radiation, such as red or infrared light. Upon stimulation, the storage phosphor releases emitted radiation of an intermediate wavelength, such as blue or violet light, in proportion to the quantity of short wavelength radiation that was received. To produce a signal useful in electronic image processing, the storage phosphor is scanned in a raster pattern by a beam of light produced, for example, by a laser deflected by an oscillating or rotating scanning mirror. The emitted radiation from the storage phosphor is sensed by a photodetector, such as a photomultiplier tube, to produce electronic image signals.

In one type of scanning apparatus, the storage phosphor is placed on a translation stage and is translated in a page scan direction past a laser beam that is repeatedly deflected in a line scan direction to form a scanning raster.

To optimize the signal-to-noise ratio of the imaging system, it is desirable to collect as much of the emitted light as possible and to direct it to the photodetector. One form of light collector is proposed in U.S. Pat. No. 4,346,295, issued Aug. 24, 1982 to Tanaka et al. The light collector proposed by Tanaka includes a light guide member comprising a sheet of light transmitting material that is flat on one end and rolled into an annular shape on the opposite end. The flat end of the light collector is positioned adjacent to the scan line on the storage phosphor. The light receiving face of a photomultiplier tube is placed against the annular end of the light guiding member. Such a light collection system has the disadvantages of being expensive and inherently complicated to manufacture. Furthermore, the collection efficiency of transparent light guide members is limited due to their absorption in the wavelength range of light emitted by storage phosphors.

In order to provide an easily manufacturable, low cost, high efficiency light collector, one of the present inventors proposed a double roof mirror light collector in U.S. Pat. No. 4,743,759, issued May 10, 1988, inventor John C. Boutet. As disclosed in this patent, a light collector for collecting and detecting light emitted from a storage phosphor in a photostimulable phosphor imaging system, includes a roof mirror light collector having a bottom roof mirror extending the width of the storage phosphor and a top roof mirror positioned over the bottom roof mirror to define a mirror box having a nearly square crosssection. The roof mirrors define slots along their peaks for passing a scanning beam stimulating radiation through the light box to the surface of the photostimulable phosphor sheet and for admitting emitted light from the storage phosphor into the light box. A photodetector is positioned at each end of the light box to convert collected light into an electronic signal representative of the latent image stored in the phosphor sheet. FIG. 13 of the above-mentioned patent, discloses a light collector which tapers from one end to the other with a light detector at the large end of the collector. In the latter configuration, if a large photo-multiplier tube having a convex face is used, the convex surface will interfere with the stimulating radiation scanning beam. Moreover, there are limitations on increasing the cone angle to increase light collection efficiency.

SUMMARY OF THE INVENTION

According to the present invention, there is provided a light collector for collecting and detecting light emitted by, reflected from, or transmitted through an information medium such as a storage phosphor which stores a latent x-ray image. The collector has high light collection efficiency and reduced light reflection loss due to its large cone angle and minimization of the number of light reflections before it is directed to a photodetector. The collector is compact and easily manufacturable since it is formed from planar mirrors and has a single photodetector which does not project beyond the side or top of the collector.

According to a feature of the present invention, a light collector includes a planar mirror and a pyramidal mirror facing the planar mirror. The mirrors extend the width of a scanned information medium such as a storage phosphor. A photodetector has a face coextensive with a centrally located aperture located in the apex region of the pyramidal mirror. Preferably, the photodetector includes a convex face which minimizes light reflections by intercepting emitted light on either side thereof.

DESCRIPTION OF THE PREFERRED EMBODIMENTS

Figure 1:
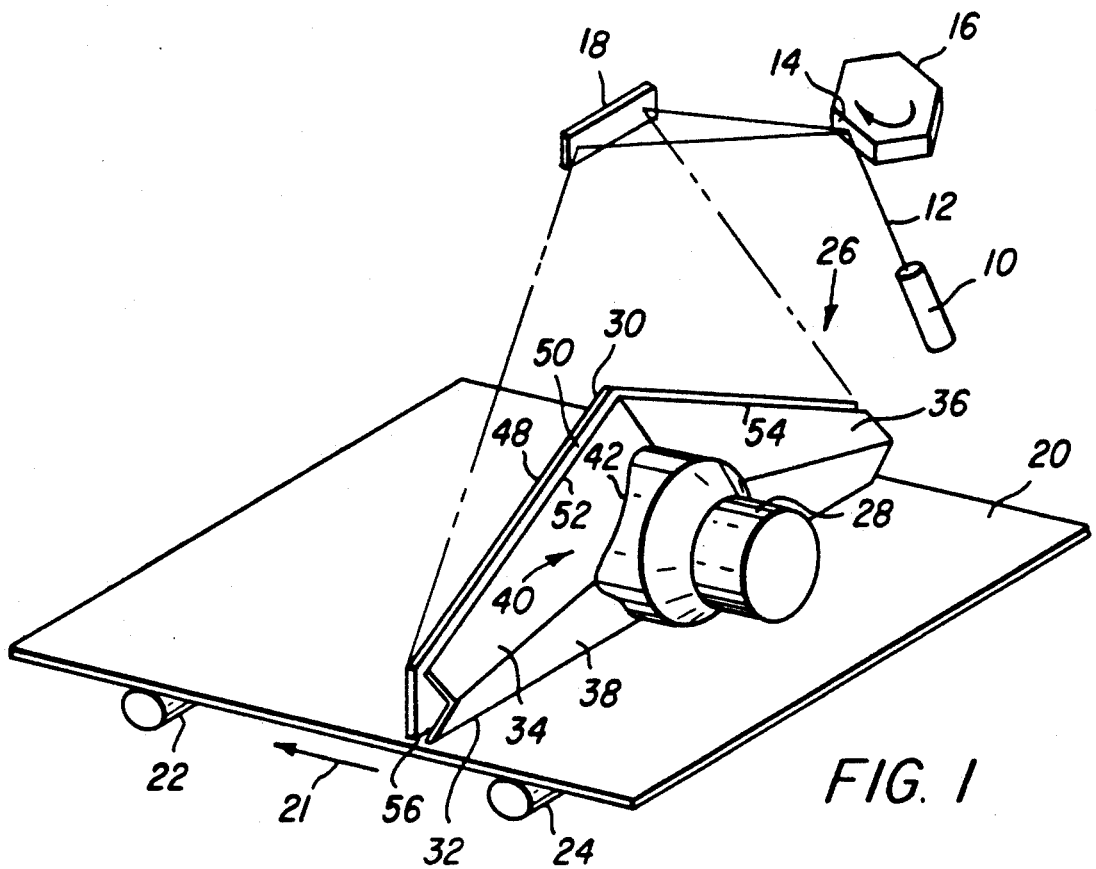
FIG. 1 is a perspective view showing a storage phosphor imaging system including an embodiment of the present invention.
Figure 2:
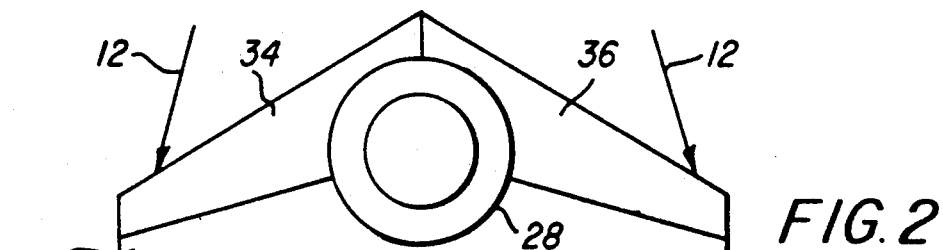
FIGS. 2, 3 and 4 are respective front elevation, side elevation and top plan views of the embodiment of FIG. 1.

Referring now to FIGS. 1-4, there will be described an embodiment of the collector of the present invention as incorporated in a storage phosphor imaging system. It will be understood that the present invention can be used in other light collecting applications (such as film digitizers) where a light is transmitted, reflected or emitted from an information (image) medium. As shown in FIG. 1, a laser 10 produces a laser beam 12 which is reflected from a mirror 14 of rotating polygon scanner 16. The laser beam 12 is deflected by mirror 18 to sweep across a storage phosphor 20 as it is transported in direction 21 by rollers 22, 24.

Storage phosphor 20 stores a latent x-ray image such as of an anatomical part of a patient. Storage phosphor 20 is scanned in a raster pattern by the coordinated movement (1) of the scanning laser beam 12 across the width of storage phosphor 20, and (2) of the movement of phosphor 20 in the direction of arrow 21 under the scanning beam 12. Storage phosphor 20 may take the form of a sheet or plate, as shown, or of a belt or drum.

The storage phosphor 20 emits light at a wavelength different from the wavelength of the stimulating light of laser beam 12. For example, laser 10 produces stimulating red light and storage phosphor 20 emits blue light. The intensities of light emitted by storage phosphor 20 is a function of the latent x-ray image stored in storage phosphor 20.

According to the present invention, the emitted light is collected and detected by collector 26 and photodetector 28. Collector 26 includes a planar mirror 30 extending the width of storage phosphor 20 and disposed substantially perpendicular thereto. Collector 26 also includes a pyramidal mirror 32 facing planar mirror 30. Pyramidal mirror 32 includes upper mirrors 34 and 36 and lower mirror 38, forming a centrally located apex region 40 having an aperture 42.

Figure 4:
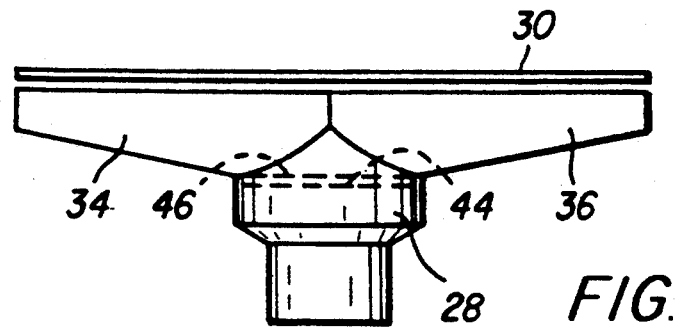

Photodetector 28 (such as a photomultiplier tube) has a light receiving face 44 coextensive with aperture 42 (FIG. 4). A filter 46 which only passes emitted light is placed over face 44.

Figure 3:
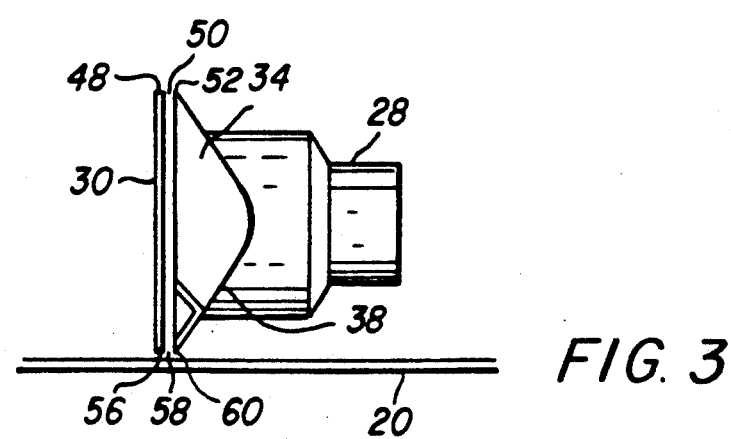

Mirror 30 has an upper edge 48 which forms an upper slot 50 with upper edges 52 and 54, respectively, of mirrors 34, 36 of pyramidal mirror 32 (FIG. 1). Mirror 30 has a lower edge 56 which forms a lower slot 58 with lower edge 60 of mirror 38 of pyramidal mirror 32 (FIG. 3). The stimulating light laser beam 12 passes through slots 50, 58 to stimulate storage phosphor 20. Light emitted by storage phosphor 20 passes into collector 26 through lower slot 58.

Preferably, one or more of mirrors 30, 34, 36, 38 selectively reflects emitted light, but not stimulating light, to reduce flare caused by reflected stimulating light from the surface of phosphor 20 (FIG. 1) reimpinging on the phosphor elsewhere and causing uncorrelated secondary emission. If mirror 30 is used for filtering out reflected stimulating light, it may be combined with the filter 54. In this design, as shown in FIG. 5, a large pentagon shaped filter is selectively aluminized on the photodetector side of the filter glass to provide aperture 51 in the aluminizing, filter mirror 30 and filter 54 as one part.

The collector of the present invention has excellent emitted light collection efficiency due to increased cone angle.

Figure 5:
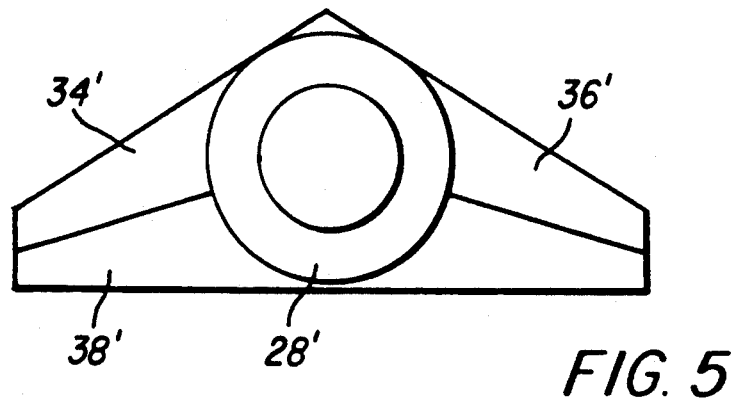
FIG. 5 is a front elevation view of another embodiment of the present invention.

Referring now to FIG. 5, there is shown another embodiment of the present invention which includes a larger photodetector 28 than used in the embodiment of FIGS. 1-4.

Figure 6:
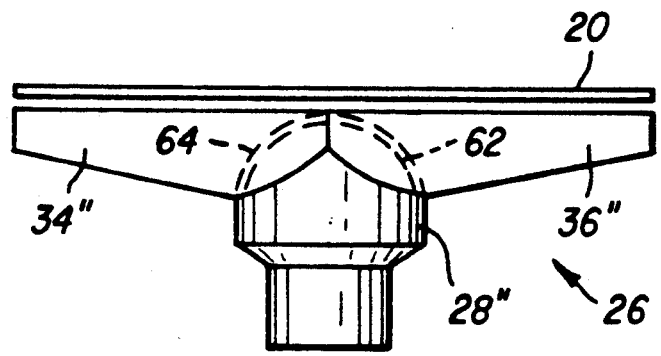
FIG. 6 is a top plan view of another embodiment of the present invention.

In the embodiment shown in FIG. 6, photodetector 28 has a convex (spherical) face 62 which extends into collector 26 and a convex filter 64 which only passes emitted light. Convex face 62 intercepts more light rays emitted from either side thereof and thus minimizes multiple reflections of emitted light and resultant mirror reflection losses. Light collection efficiency is thus increased.

INDUSTRIAL APPLICATION

The light collector of the present invention finds application in the medical diagnostic field, such as in digital radiography in which an x-ray of a patient's anatomical part is stored in a storage phosphor which is read out as a digital x-ray image.

Although this invention has been described with reference to preferred embodiments thereof, it will be understood that variations and modifications can be effected within the spirit and scope of the invention as described above and as defined in the appended claims.

What is claimed is:

1. A light collector and detector for collecting and detecting light emitted, reflected or transmitted by a scanned information medium, comprising:

a planar mirror for extendingg the width of a scanned information medium and for disposition substantially perpendicular thereto, said planar mirror having a lower edge adjacent to the scanned medium and an upper edge spaced from the lower edge;

a pyramidal mirror for extending the width of said medium, facing said planar mirror, said pyramidal mirror having upper and lower edges spaced from said respective upper and lower edges of said planar mirror, thereby forming aligned slots for the passage of a scanning beam of radiation to a medium to be scanned and for allowing light emitted, reflected or transmitted by the scanned medium to enter said collector;

wherein said pyramidal mirror has an aperture in an apex region thereof; and photodetector means having a light receiving face coextensive with said aperture of said pyramidal mirror, for receiving light from said scanned medium and reflected by said collector and for generating an electrical signal in response thereto.

2. The collector and detector of claim 1 wherein, in use, said collector is located adjacent to a storage phosphor and wherein a scanning beam of stimulating light is passed through said upper and lower slots of said collector to said storage phosphor and stimulated light emitted by said storage phosphor passes through said lower slot into said collector, and including a filter over the face of said photodetector means for only passing emitted light, but not stimulating light to said photodetector means.

3. The collector and detector bf claim 1 wherein said photodetector means has a convex face which extends into said collector.

4. The collector and detector of claim 2 wherein said photodetector means has a convex face which extends into said collector and wherein said filter has a convex shape covering said convex face of said photodetector means.

5. The collector and detector of claim 1 wherein at least one of said planar and said pyramidal mirror selective reflects emitted light.

* * * * *